3,121,699
PREPARATION OF FOAMED POLYURETHANE MATERIALS
Peter Merriman, Edgbaston, Birmingham, England, assignor to Dunlop Rubber Company Limited, London, England, a British company
No Drawing. Filed Mar. 27, 1961, Ser. No. 98,322
Claims priority, application Great Britain Apr. 30, 1960
6 Claims. (Cl. 260—2.5)

This invention relates to foamed polyurethane material which is prepared by the reaction of an organic polyether, polyester or polyesteramide polyol having terminal isocyanate reactive hydrogen containing groups, herein referred to simply as a "polyol" with a polyisocyanate in the presence of water, a foam stabilizing agent and a catalyst, a foaming agent or inflatant, the foamed structure being engendered by the action of the foaming agent or inflatant.

According to the invention a method of preparing foamed polyurethane material comprises reacting a mixture of a polyol with a polyisocyanate in the presence of water, a foam stabilizing agent and a catalyst, wherein acetaldehyde or a derivative thereof having a boiling point not greater than about 30° C. is included in the reaction mixture, the reaction mixture being allowed to foam and set in a mould and the acetaldehyde being vapourized by the heat produced by the reaction and inflating the reaction mixture during the foaming and which is thereby formed into a polyurethane material of the preferred density.

Reference herein to "polyisocyanate," "isocyanate," "polyether" and "polyol" include the respective sulphur analogues, i.e., isothiocyanate, thioether and thiol compounds. By "active hydrogen" is meant hydrogen atoms which are reactive as detected by the Zerewitinoff method.

The foamed polyurethane material may be prepared by a prepolymer technique wherein a polyol is initially reacted with at least a portion of the polyisocyanate and the prepolymer which results is subsequently cross-linked, for example with water which also acts as a foaming agent by reacting with isocyanato groups and thereby producing carbon dioxide which foams the product. The acetaldehyde may be incorporated in the prepolymer and the acetaldehyde-containing prepolymer may then be continuously admixed with any further polyisocyanate and the water, surfactants and catalysts in predetermined proportions. The amount of acetaldehyde employed may be varied within a wide range but is generally from 0.5 to 15 percent and more usually from 1 to 10 percent by weight of the polyol and the polyisocyanate.

It is preferred to prepare the polyurethane material by a one-shot process in which the initial reaction resulting in a prepolymer is omitted, and the process is preferably carried out by continuous admixture of the reactants which are supplied to a mixing chamber at predetermined rates, the mixed liquid composition which results then foaming and cross-linking to produce a continuous length of foamed material in known manner. In this one-shot process the acetaldehyde may be continuously mixed into the reactants, or may be previously incorporated in the polyol.

In the prepolymer technique a surface-active foam stabilizing agent, preferably a silicone oil for example a polydimethyl siloxane having a viscosity of from 25 to 100 centipoises, is added together with a catalyst for the reaction such as a tertiary amine, for example N-methyl morpholine, triethylamine, dimethylbenzylamine or mixtures of such tertiary amines.

In the one shot process the surface-active foam-stabilizing agent is preferably a water dispersible or water soluble silicone compound such as a graft copolymer of polydimethylsiloxane with polyalkylene oxides, having a viscosity of from 25 to 100 centipoises, and the catalyst comprises triethylene diamine, an organo-tin compound such as dibutyl tin dilaurate, an organic salt of stannous tin such as stannous octoate, or mixtures thereof with or without tertiary amines.

The molar equivalence of the polysiocyanate to the polyol may vary from 1.3 to 5, being relatively low where the amount of water or the like foaming agent employed is low, for example in the production of high density foamed material and in cases where a polyol with a functionality greater than two is employed. The molar equivalence is preferably in the range of from 3 to 4.5 being higher when a prepolymer technique is employed than when use is made of a one-shot process. By "molar equivalence" is meant the proportion of the polyisocyanate employed with respect to the amount of polyisocyanate required to provide one isocyanato group for each terminal or substantially terminal isocyanato reactive group of a mole of the polyol employed.

The preferred polyether, polyester or polyesteramide polyols are those wherein all of the oxygen or sulphur atoms in the molecule are linked to carbon atoms by single bonds and having a mean molecular weight of from 750 to 10,000. In general the polyalkylene ether polyol diols, triols and tetrols are preferred.

The polyalkylene ether polyols which are preferred possess the lower alkylene groups, especially those which contain 2, 3, or 4 carbon atoms in the repeated monomeric group and have a mean molecular weight of more than 1,500.

The organic polyisocyanate is preferably an aromatic diisocyanate such as toluene diisocyanate.

Acetaldehyde has a boiling point of 21° C., and is vaporized by the heat produced in the exothermic reaction of the isocyanate groups, the reaction product usually reaching a temperature in the region of 80° C. to 120° C. depending upon the bulk dimensions of the material produced and the reaction conditions. Substitution products of acetaldehyde may be employed as inflatants but compounds which are unduly reactive with the reactants employed should be avoided, as should compounds which are vaporized so slowly as to leave an unvaporized residue in the polyurethane material. In general the compounds should have a boiling point not greater than about 30° C. and the halogen compounds are preferred.

The invention will be described with reference to the following examples in which the parts are by weight.

*Example 1*

100 parts of a polypropylene oxide triol copolymerized with ethylene oxide and available as polyglycol 112-3 from Dow Chemical Company;
  5 parts of acetaldehyde
were stirred together. The mixture was stirred for 10 to 12 seconds by means of an 800 r.p.m. stirrer with
  0.5 part of a water-soluble organo-silicone polymer having a viscosity of 900 centistokes at 25° C. available from Union Carbide Chemicals Company,
  3 parts of water and
  3 parts of NN-dimethyl benzylamine.
  34 parts of a mixture of 80 percent of 2:4- and 20 percent of 2:6-tolylene diisocyanate, and available from Imperial Chemical Industries, Limited, were then added and the whole stirred again on the same apparatus for a further 6–7 seconds.

The thin cream which resulted was immediately poured into a paper-bag mould when it foamed in about 90 seconds and gelled in about 3.75 minutes. It was then transferred to a 70° C. oven and within 20 minutes had developed into a foam of sufficient strength and freedom from internal tackiness to permit mangling between steel rolls for the purpose of bursting open any closed pores. After mangling, the foamed material was matured at room temperature for 7 days and then tested and found to be a moderately soft, resilient structure of good resistance to humid ageing. The density of the foam averaged 0.039 gram/cc.

For purposes of comparison the above process was then repeated, except that the quantity of tolylene diisocyanate of Example 1, was increased to 38 parts and the acetaldehyde was omitted. The resulting cream was somewhat less thin, but the foaming and subsequent behaviour were the same as before. After the same post-treatment of the foamed material which resulted, a moderately hard and rather less resilient product was obtained having good humid ageing resistance. Its average density was 0.048 gram/cc.

Reductions of 10 percent is isocyanate requirements and 17 percent in density were therefore achieved by introducing the acetaldehyde.

*Example 2*

Sufficient distilled water was added to a polyoxypropylene diol of hydroxyl value 53.5 and acid value 0.3 to increase its water content to 0.3 percent.

200 parts of this mixture were introduced into a stainless steel reactor under an atmosphere of nitrogen, and the temperature raised to 25° C.

24 parts of tolylene diisocyanate of Example 1 were then added, with stirring, at a steady rate over a period of 10 minutes. Stirring was then continued, firstly for ten minutes without heating, and then while the temperature was steadily raised to 105° C. over 40 minutes. Stirring and heating were continued for 3 hours at 105° C. ±2 degrees.

20 parts of tolylene diisocyanate were then added at a steady rate over the next 55 minutes, the temperature being maintained constant. The prepolymer syrup so produced was then cooled to 30° C. over the next 30 minutes, and its NCO content was determined and adjusted to 8.5 percent by adding, 10 parts of tolylene diisocyanate with stirring.

The resulting prepolymer syrup was stored for 2 days.

A control foamed product was prepared as follows:

100 parts of the prepolymer syrup were then stirred for 8 to 9 seconds using 3,000 r.p.m. laboratory stirrer with the following additions:

3 parts of water;
0.5 part of a silicone oil, preferably polydimethyl silicone oils of 50 cps. viscosity sold as MS 200 by Midland Silicones Limited;
1 part of N-methyl morpholine, and
0.3 part of triethylamine.

The resulting cream was poured into a paper-bag mould and a moderately soft, resilient foam of 0.044 gram/cc. density and excellent resistance to humid ageing was obtained.

100 parts of the prepolymer syrup prepared above and 1.7 parts of acetaldehyde were stirred over a period of 1 minute. Following the same procedure, and using the same quantities of additions as in the control, the mixture yielded a soft, resilient foam of 0.035 gram/cc. having excellent resistance to humid ageing.

With the same isocyanate usage, therefore, a 20 percent reduction in foam density was achieved by introducing the acetaldehyde.

*Example 3*

A control foamed product was prepared as follows: on a laboratory foaming machine fitted with a high-speed stirrer and Bosch injection nozzles, the following ingrients were simultaneously injected at the stated rates under a pressure of 100 atmospheres into a 960 parts/min. stream of an approximately 3,000 m. wt. polypropylene glycol triol available as "Niax Triol LG-56" which is obtainable from Union Carbide Chemicals Company and is apparently a polypropylene oxide adduct of glycerol;

380 parts/min. of a mixture of 80 percent 2:4- and 20 percent 2:6-tolylene diisocyanate;

34 parts/min. of an aqueous surface-active mixture prepared by mixing 5 parts of a water soluble organo silicone copolymer having a viscosity of 900 centistokes at 25°, said material being available as X-520 from Union Carbide Chemicals Company and 29 parts of water;

30 parts/min. of a mixture of 2 parts of the poly propylene oxide triol of a molecular weight of about 3000 and a hydroxyl number of about 56, known as Niax Triol LG-56 and 1 part of triethylamine;

30 parts/min. of a mixture of 14 parts of the poly propylene oxide triol of a molecular weight of about 3000 and a hydroxyl number of about 56, known as Niax Triol LG-56 and 1 part of dibutyl tin dilaurate.

The emerging stream of liquid was collected in open paper-lined trays where it foamed up in about 2 minutes and gelled in about 2½ minutes. The foam blocks so produced were matured for ten minutes at the temperature engendered by the exothermic reaction and then mangled to break any closed cells. The blocks were stored for 7 days at room temperature and then tested. They were of medium hardness and good resilience with a density of 0.042 gram/cc.

The method was then repeated with the addition of 3½ percent of acetaldehyde on the total polyoxypropylene triol content, this being premixed with the main supply of polyoxypropylene triol. The foaming and gelation behavior and the post-treatments of the foam were as before. The foam blocks produced were of excellent resilience but slightly softer and had an average density of 0.039 gram/cc.

A reduction in density of 9 percent was thus achieved by the acetaldehyde addition, without alteration to the isocyanate content.

Having now described my invention, what I claim is:

1. A process for preparing foamed polyurethane materials which comprises reacting a mixture of ingredients including a polyalkylene ether polyol having a mean molecular weight of more than 1,500, an organic polyisocyanate, water, a foam stabilizing agent, and a catalyst, and inflating said mixture by vaporizing acetaldehyde by the heat produced in the exothermic reaction of the above ingredients, the acetaldehyde being included among the above ingredients during the foaming and setting of the foam within a mold.

2. A process as claimed in claim 1 wherein the molar equivalence of the polyisocyanate with respect to the polyalkylene ether polyol is in the range of from 1.3 to 5.

3. A process as claimed in claim 1 wherein the amount of acetaldehyde is in the range of from 1 to 10 percent by weight of polyalkylene ether polyol and isocyanate.

4. A process as claimed in claim 2 wherein the reactants are continuously supplied to a mixing chamber.

5. A process as claimed in claim 1 wherein the acetaldehyde is incorporated in the polyalkylene ether polyol and supplied to a mixing chamber therewith.

6. A process as claimed in claim 1 wherein the polyalkylene ether polyol is initially reacted with the polyisocyanate, and the acetaldehyde is incorporated in the resulting prepolymer.

References Cited in the file of this patent

UNITED STATES PATENTS 2,763,624    Newell _____ Sept. 18, 1956
2,764,565    Hoppe et al. _____ Sept. 25, 1956